United States Patent [19]

Landrum, Jr.

[11] Patent Number: 4,715,020

[45] Date of Patent: Dec. 22, 1987

[54] SIMULTANEOUS PERFORMANCE OF MULTIPLE SEISMIC VIBRATORY SURVEYS

[75] Inventor: Ralph A. Landrum, Jr., Houston, Tex.

[73] Assignee: Western Atlas International, Inc., Del.

[21] Appl. No.: 925,810

[22] Filed: Oct. 29, 1986

[51] Int. Cl.$^4$ .............................................. G01V 1/00
[52] U.S. Cl. ........................................ 367/38; 367/40; 367/48
[58] Field of Search ................. 367/37, 38, 40, 48, 367/50, 59, 63; 364/421

[56] References Cited

U.S. PATENT DOCUMENTS

| | | | |
|---|---|---|---|
| 3,885,225 | 5/1975 | Anstey et al. | 340/15.5 |
| 3,956,730 | 5/1976 | Barbier | 367/37 |
| 4,159,463 | 6/1979 | Silverman | 340/15.5 |
| 4,168,485 | 9/1979 | Payton et al. | 367/41 |
| 4,188,610 | 2/1980 | Nelson | 367/14 |
| 4,295,213 | 10/1981 | Mifsud | 367/41 |

FOREIGN PATENT DOCUMENTS

25893/84  9/1984  Australia.
0122824  10/1984  European Pat. Off..

OTHER PUBLICATIONS

Pierre L. Goupillaud, Continental Oil Company, "Signal Design in the Vibroseis ® Technique" presented at the 44th Annual SEG Meeting, Nov. 12, 1974, Dallas, Tex.

R. Garotta, C.G.G., France, "Simultaneous Recording of Several Vibroseis ® Seismic Lines", 1983 SEG Abstracts.

R. Garotta, "Simultaneous Recording of Several Vibroseis Lines", CGG Technical Series No. 531.83.07, presented at 45th EAEG Meeting-Oslo, Norway-Jun. 14-17, 1983.

*Primary Examiner*—Charles T. Jordan
*Assistant Examiner*—John W. Eldred
*Attorney, Agent, or Firm*—E. Eugene Thigpen

[57] ABSTRACT

The invention is a method of performing a plurality of vibratory seismic surveys simultaneously. A plurality of vibratory sources transmit signals into the earth. Each vibratory source successively transmits the same signal, except that an offset phase of the signal is selectively shifted for successive transmissions. The offset phase of the signal transmitted by each vibratory source is selected to enable the signal from each of the vibratory sources to be recovered by data processing.

16 Claims, 4 Drawing Figures

SIMULTANEOUS PERFORMANCE OF MULTIPLE SEISMIC VIBRATORY SURVEYS

BACKGROUND OF THE INVENTION

1. Field of the Invention

This invention relates in general to seismic prospecting, and in particular, it relates to a method for performing seismic surveys.

2. Description of the Prior Art

To locate reflecting interfaces in the earth, seismic signals are transmitted through the earth, reflected by subterranean interfaces and are detected and recorded. The time lapse between the transmission, reflection by an interface, and detection of the signal gives the two-way travel time of the signal through the earth, which is then used to located the interface.

It has become common to use seismic vibrators in seismic prospecting. Typically, a number of vibrators emit a long swept frequency signal in the seismic frequency range. The emitted signal (after reflection and refraction within the earth) is received by detectors spaced along a spread, and the received signal is cross-correlated with the emitted swept frequency signal. This operation yields a seismic record which is then processed into a representation of a cross-section of the earth, using techniques well known in the art.

Typically, three vibrators may be used in a given seismic survey in order to increase the energy transmitted to the earth. All three vibrators are positioned at substantially the same location and are controlled to emit simultaneously the same signal. Although three vibrators may be used, only one survey is conducted. In many instances, it would be economical to conduct a plurality of surveys simultaneouly, especially when performing three-dimensional surveys. However, in order to conduct multiple surveys at the same time, at the same general location, it is necessary somehow to be able to distinguish, in the recorded signal, signals being emitted from one vibratory source from the signals emitted by the other vibratory sources. The term "vibratory source" is intended to means either a single vibrator or a plurality of vibrators which are controlled to emit a common signal at substantially the same location.

In U.S. Pat. No. 3,885,225, issued May 20, 1975, to Anstey et al, there is shown one method of conducting a plurality of surveys simultaneously. In this method, the swept frequency seismic signal is broken up into a number of component parts. If, for example, it is desired to emit signals within the frequency range between 10 and 46 Hz, this range may be broken into three segments of 10 to 22 Hz, 22 to 34 Hz, and 34 to 46 Hz. Three different vibratory sources are utilized, each one simultaneously emitting signals from a different one of these frequency segments, so that if the first vibrator is emitting a signal in the range of 10 to 22 Hz, the second vibrator might be emitting energy in the range of 22 to 34 Hz, and the third vibrator emitting energy in the range of 34 to 46 Hz. Reflected energy from all three sources is detected by the same geophones and recorded. However, when this recorded signal is cross-correlated with the signal emitted by the first vibrator, which extends only from 10 to 22 Hz, the signals originating from the second and third vibrators in the ranges of 22 to 34 Hz, and 34 to 46 Hz, will be substantially eliminated from the cross-correlated record. The received signal is similarly cross-correlated with the signal emitted by the second vibrator between 22 to 34 Hz, and with the signal emitted by the third vibrator between 34 and 46 Hz.

After the initial frequency segments are injected into the earth, the control signals for all three vibratory sources are interchanged so that, for example, vibrator source number 1 now emits energy in the 22-34 Hz range, vibrator 3 emits energy in the 10-22 Hz range and vibrator 1 emits energy in the 22-34 Hz range. Subsequently, another sweep is made in which vibrator 1 now emits energy in the 34-46 Hz range, vibrator 2 emits energy in the 10-22 Hz range, and vibrator 3 emits energy in the 22-34 Hz range. In each instance, the recorded signal is correlated separately with the transmitted signal from each of the vibrators to discriminate against the energy emitted by the other vibrators so that after three emissions, a cross-correlated record of energy extending over the entire desired frequency range of 10 to 46 Hz will be attained for each of the three vibrators. The three cross-correlated records corresponding to each vibrator are then stacked. A disadvantage of this method is that three separate sweeps must be made to generate signals over the desired frequency range. Because a "listening" time is required after each sweep to allow energy to return to the surface from the deepest formations of interest, use of this method is somewhat slower than would be the case if each vibrator could be swept through the entire frequency range of interest without stopping.

U.S. Pat. No. 4,295,213, issued Oct. 13, 1981 to Mifsud, also discloses the possibility of transmitting simultaneously a plurality of seismic signals extending over different frequency range. This disclosure, however, was directed towards using alternate upsweeps and downsweeps for different segments of the frequency band in the conducting of a single survey. The invention is directed toward utilizing a segmented sweep as a means of reducing correlation noise within a single survey rather than enabling a plurality of surveys to be conducted simultaneously.

In European Patent Application, Publication No. 0122824, and corresponding Australian Patent Application, No. AU-A-25893/84, there is disclosed a method of simultaneously conducting two surveys. In this method, two vibratory sources simultaneously emit separate vibratory signals. The first of these vibrators successively transmits an identical signal. The second vibrator also successively transmits a signal which is identical during each transmission, except that during alternate transmissions, the phase of the signal is reversed. After the received signals from these transmissions are recorded, successive pairs of these received signals are summed together. It can be seen that when two such recorded signals are summed together, the energy emitted by the first vibratory source will sum together, but since the energy emitted by the second vibratory source has an alternate phase reversal, the energy from the second source will be substantially omitted from the record. A second summation of the two signals is also made, but prior to making the second summation the second recorded signal of the pair is reversed in phase. The result now is that signals originated from the first vibratory source are in opposite phase, and signals originating from the second vibratory source are now in phase. After summation of this signal pair, the signal from the first vibratory source will be substantially eliminated and the signals from the second source will be added. Such a straightforward approach, of course, is usable with only two vibratory sources.

Alternatively, the two vibratory sources may continually transmit the same signal, with one vibrator sweeping from a low frequency to a high frequency and the other source sweeping from a high frequency to a low frequency. Use of this method, however, produces cross-talk between the two transmitted signals. See also "Simultaneous Recording of Several Vibroseis Seismic Lines," by R. Garotta, 1983 SEG Abstracts, and "Simultaneous Recording of Several Vibroseis Seismic Lines" CGG Technical Series No. 531.83.07.

The use of pseudo-random codes to perform multiple seismic surveys simultaneously has also been proposed. See "Signal Design in the "VIBROSEIS ® Technique" by Pierre L. Goupillaud, presented at the 44th Annual International SEG meeting, Nov. 12, 1974. In this method, a set of pseudorandom signals which are substantially orthogonal (uncorrelated) each to the other are transmitted by the different sources. When the recorded signal, which includes signals emitted by each of the sources, is correlated with a selected one of the transmitted signals, the signals from the other sources will be substantially eliminated. It is difficult to generate such signals with seismic vibrators, however. In general vibrators are capable of transmitting only sine waves, which may be "swept" with time.

SUMMARY OF THE INVENTION

This invention is a method of performing a plurality of vibratory seismic surveys simultaneously at substantially the same location.

In accordance with the present invention, a plurality of vibratory sources, equal in number to the number of seismic surveys being conducted, transmit signals into the earth. After the first transmission is completed, additional transmission are performed in which the phase of the signals transmitted by the various vibratory sources is selectively shifted. The number of phase relationships is equal to the number of vibratory sources. The phase at which the seismic signals are transmitted from each vibratory source is selected to enable the signal from each of the vibratory sources to be recovered by data processing.

The detected signal resulting from each simultaneous transmission is correlated separately with the signal transmitted by each vibratory source during the transmission. The correlated signals resulting from the correlations of the detected signals with the transmitted signals from each respective vibratory source are then summed or "stacked". This stacking produces records in which the seismic signals emanating from each vibratory source are separated from the signals emanating from the other vibratory sources.

In practicing this invention, each vibratory source may transmit the same waveform, with the phase of the signal waveform transmitted by each vibratory source varied as specified herein. Entirely different waveforms may also be transmitted by different vibratory sources. Each waveform may also have a different time duration.

For n sources, n phase angles are selected such that the vector summation of n vectors, each having a phase angle corresponding to a different one of said selected phase angles, is substantially zero for equal length vectors. The initial or offset phase of the signal waveforms transmitted by each vibratory source is varied among the n selected phase angles during the n (or a multiple of n) signal tranmissions to enable the signal emanating from each vibratory source to be separated from the signals emanating from the other vibratory sources.

DESCRIPTION OF THE PREFERRED EMBODIMENT

Figure 1:
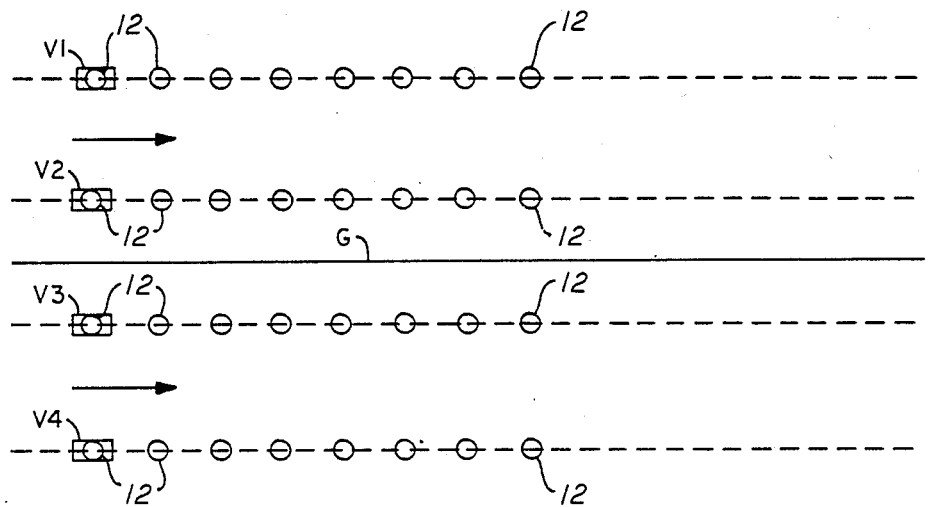
FIGS. 1 and 2 are diagrams illustrating use of the invention to perform a three-dimensional survey.

This invention will be generally described with respect to a land survey, but it may be applied in both land and marine seismic surveys. In conducting seismic surveys with vibrators, typcially two or three vibrators will be operated in unison to transmit the same signal into the earth. As used herein, the term vibratory source will include a single vibrator or a plurality of vibrators operated in unison to transmit substantially an identical signal.

The invention is a method of conducting n seismic surveys simultaneously at substantially the same location. To conduct n seismic surveys, n vibratory sources are required, and all n vibratory sources transmit n sweeps (or a multiple of n sweeps) into the earth to complete a sequence. In a preferred embodiment, the signals transmitted to the earth may be generally represented by:

$$S = A \sin [\phi(t) + \phi_o]$$

where $\phi(t)$ is a function of time and $\phi_o$ represents the initial phase.

The initial phase of the signal transmitted by each vibratory source during each transmission of a sequence may be selected according to the following formula $$\phi_o = \frac{360°(s-1)(v-1)}{n}$$

where
$\phi_o$ = initial phase
S = sweep number
v = vibrator source number
n = total number of source The phase shift is independent of frequency, so the initial phase shift will be present throughout a given sweep, and may properly be referred to as offset phase.

The above formula may be utilized for any number of vibratory sources, even or odd. If an even number of vibratory sources are used other phase angle selections are possible. For an even number of sources, it is only necessary that for any given phase selection, the phase angle 180° out of phase with the given phase angle must also be selected. However, it is preferable to select phase angles having the maximum separation, in order to minimize the possible interference between signals.

For an even number of vibratory sources, the initial phase of the signals transmitted by the vibratory sources during successive transmissions may be selected as follows: After the n phase angles have been selected, these may be designated as phase number 0, phase number 1, phase number 2, . . . phase number (n−1), with the magnitude of the phase angle successively increasing with the phase number. The phase number for each transmission by each vibratory source may then be selected from the formula:

$$\text{Phase number} = (s-1)(v-1) - an$$

where
s = sweep number
v = vibrator source number
n = total number of sources
and a is a whole number selected so that $$0 \leq [(s-1)(v-1) - an] \leq n$$

To perform four vibratory surveys, using four vibratory sources, and utilizing the formula:

$$\phi_o = \frac{360°(s-1)(v-1)}{n}$$

the offset phase of the signals generated by the four vibratory sources during the four successive transmission (or sweeps) will be as follows:

|  | Sweep 1 | Sweep 2 | Sweep 3 | Sweep 4 |
|---|---|---|---|---|
| Vibrator 1 | 0° | 0° | 0° | 0° |
| Vibrator 2 | 0° | 90° | 180° | 270° |
| Vibrator 3 | 0° | 180° | 0° | 180° |
| Vibrator 4 | 0° | 270° | 180° | 90° |

Using the second procedure applicable only to an even number of vibrators, with the following phase selection,
Phase number 0 = 0°
Phase number 1 = 60°
Phase number 2 = 180°
Phase number 3 = 240°,
the offset phase of the transmitted signals will be as follows during the four sweeps:

|  | Sweep 1 | Sweep 2 | Sweep 3 | Sweep 4 |
|---|---|---|---|---|
| Vibrator 1 | 0° | 0° | 0° | 0° |
| Vibrator 2 | 0° | 60° | 180° | 240° |
| Vibrator 3 | 0° | 180° | 0° | 180° |
| Vibrator 4 | 0° | 240° | 180° | 60° |

In performing a seismic survey in accordance with the present method, a selected number of vibratory sources, shown in FIG. 1 as V1, V2, V3 and V4, may be advanced in alignment at laterally spaced apart locations. Typically, the lateral spacing may be about 50 meters. A first transmission is made at an initial position 12, and the vibratory sources may then be advanced to the next position 12 which may be about 10 meters from the initial position, and a second transmission made with the signal phase shift advanced according to the criteria stated herein. The vibrators are then successively advanced and the signal phases selectively shifted until a sequence is completed, and then, at the next vibrator position, a repetition of the transmission sequence begins. Possible variations in the method are apparent. For example, a given sweep may be repeated any desired number of times, so long as each sweep within a sequence is repeated the same number of times. It may be desirable to transmit multiple sweeps at each location. The vibrators may advance along either side of a geophone spread G as shown in FIG. 1.

Figure 2:
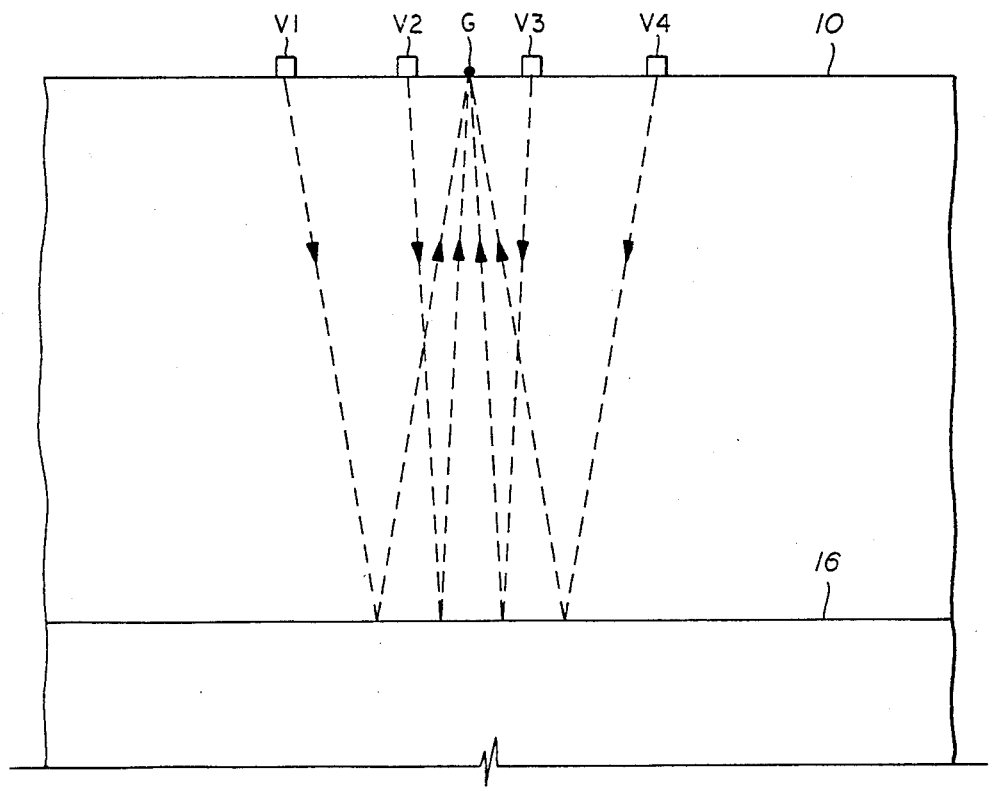

As shown in FIG. 2, the seismic energy travels from the earth's surface 10 downwardly, until it reaches a reflecting interface, such as interface 16. From the interface, a portion of the energy is reflected back to the surface where it is detected. As shown in FIG. 2, energy is reflected back to geophone array G from a different location on reflecting interface 16 for each of the sources. Accordingly, four vibratory sources are able to perform four surveys simultaneously.

The process by which the signal from each of the vibratory sources is separated from the signals emitted by the other vibratory sources is illustrated below. For simplicity, the method is illustrated with only three sources, but the principle applies to other numbers, as well. For three sources, three signals ($S_1$, $S_2$ and $S_3$) will be injected having an offset phase calculated as follows from the formula:

$$\phi_o = \frac{360°(s-1)(v-1)}{n}$$

|  | Sweep 1 | Sweep 2 | Sweep 3 |
|---|---|---|---|
| Vibrator 1 | $S_1 \angle 0°$ | $S_1 \angle 0°$ | $S_1 \angle 0°$ |
| Vibrator 2 | $S_2 \angle 0°$ | $S_2 \angle 120°$ | $S_2 \angle 240°$ |
| Vibrator 3 | $S_3 \angle 0°$ | $S_3 \angle 240°$ | $S_3 \angle 480°$ |

It is understood that an angle of $\phi + 360°$ or $\phi + 720°$ is equivalent to an angle $\phi$, so the angle of 480° will be shown below as 120°. The signal transmitted by vibratory source 1 is designated as $S_1$, the signal from source 2 as $S_2$, and from source 3 as $S_3$. These signals may be identical except for the phase difference, but they may also be entirely different signals. It is understood that 0° is an arbitrary reference point, and if the phase of the signals transmitted by each vibratory source during each sweep is changed by the same amount, the process will be equivalent. It is understood also that the sweeps do not have to be performed in the order shown herein, but may be performed in any random order.

The signals originating from each vibratory source are separated from the signals emanating from the other vibratory sources by the correlation and stacking process. It is apparent, for example, that if three vibratory sources are injecting signals simultaneously, a geophone positioned near the three sources will detect signals from all three sources. In practicing the invention, utilizing three sources, three separate signal transmissions are made for each transmission sequence, in which the offset phase of the signals transmitted by the three sources are selectively altered, as shown above, for the second and third transmissions. The signals detected from each of the transmissions is separately correlated with the signal injected by each of the sources for each transmission, which yields nine correlated signals. The three correlation signals resulting from the correlation of each of the detected signals with the signal transmitted by each vibratory source are summed or "stacked", thereby yielding three stacked signals in which each stacked signal contains substantially only the signal originating from one of the three vibratory sources.

The reflected signal present at a geophone during the first, second and third sweeps will include signals emanating from all three sources as follows:

Sweep 1: $S_1 \angle 0° + S_2 \angle 0° + S_3 \angle 0°$
Sweep 2: $S_1 \angle 0° + S_2 \angle 120° + S_3 \angle 240°$ -continued Sweep 3: $S_1\angle 0° + S_2\angle 240° + S_3\angle 120°$ Three separate correlators are utilized, with each correlator correlating each received signal with the signal transmitted by a particular one of the vibratory sources during each sweep.

The output signals from Correlator 1 are:

For Sweep 1:
$S_1\angle 0° \times S_1\angle 0° + S_1\angle 0° \times S_2\angle 0° + S_1\angle 0° \times S_3\angle 0°$
For Sweep 2:
$S_1\angle 0° \times S_1\angle 0° + S_1\angle 0° \times S_2\angle 120° + S_1\angle 0° \times S_3\angle 240°$
For Sweep 3:
$S_1\angle 0° \times S_1\angle 0° + S_1\angle 0° \times S_2\angle 240° + S_1\angle 0° \times S_3\angle 120°$ When these three correlated signals are now summed in the stacker, the signal from vibrator 1 is recovered. Because of the phase relationships, the signals from vibratory sources 2 and 3 are substantially cancelled.

Similarly Correlator No. 2 yields:

For Sweep 1:
$S_2\angle 0° \times S_1\angle 0° + S_2\angle 0° \times S_2\angle 0° + S_2\angle 0° \times S_3\angle 0°$
For Sweep 2:
$S_2\angle 120° \times S_1\angle 0° + S_2\angle 120° \times S_2\angle 120° + S_2\angle 120° \times S_3\angle 240°$
For Sweep 3:
$S_2\angle 240° \times S_1\angle 0° + S_2\angle 240° \times S_2\angle 240° + S_2\angle 240° \times S_{31}\angle 120°$ and correlator no. 3 yields For Sweep 1:
$S_3\angle 0° \times S_3\angle 0° + S_3\angle 0° \times S_2\angle 0° + S_3\angle 0° \times S_3\angle 0°$
For Sweep 2:
$S_3\angle 240° \times S_1\angle 0° + S_3\angle 240° \times S_2\angle 120° + S_3\angle 240° \times S_3\angle 240°$
For Sweep 3:
$S_3\angle 120° \times S_1\angle 0° + S_3\angle 120° \times S_2\angle 240° + S_3\angle 120° \times S_3\angle 120°$ When the three correlated signals from correlator number 2 are "stacked", the signals emanating from vibratory sources 1 and 3 are substantially eliminated. Similarly when the three correlated signals from correlator no. 3 are stacked, the signals emanating from vibratory sources number 3 is recovered.

Similarly, for any number "n" of surveys (and n vibratory sources), each of the n detected signals is separately correlated with the waveform transmitted by each of the vibratory sources to yield $n^2$ correlated signals. When the n correlated signals are stacked which were produced by correlating the signal injected by one of the vibratory sources with the received signal for each of the n transmissions, the signal from the particular vibratory source is separated from the signals originating from the other vibratory sources.

Figure 3:
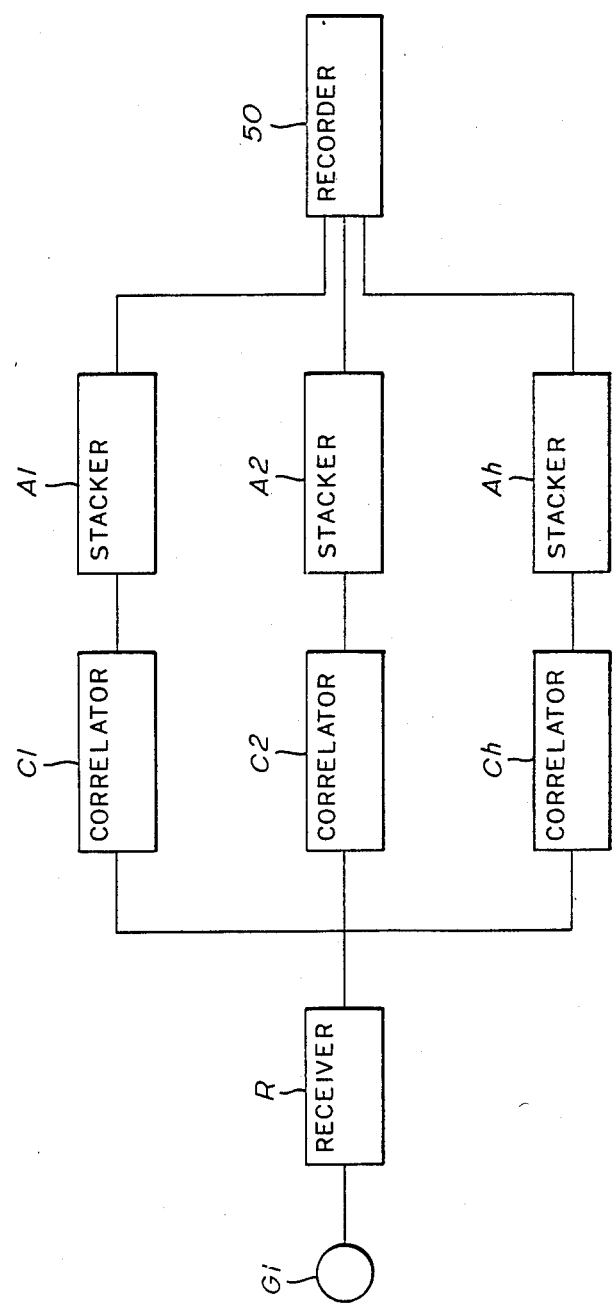
FIG. 3 is a simplified diagram of field electronic equipment useful in practicing the invention.

FIG. 3 shows a simplified version of the field detection and recording equipment useful in practicing the invention. The output signal from geophone G1 is connected to Receiver R, where it may be amplified and applied to correlators C1, C2 . . . Cn. The correlator output signals are then stacked in stackers A1, A2 . . . An, and the stacked output signals then permanently recorded by a bulk recorder 50 which may be a tape recorder. The electronic detection, processing and recording equipment is not shown in detail because such equipment is well known to those of ordinary skill in the art. It is understood that the correlated and stacking steps might be performed in a data processing center rather than in the field.

In addition to use in two-dimensional (2-D) and three-dimensional (3-D) seismic surveys, the method of this invention is especially useful in VSP (vertical seismic profiling) and downhole checkshot recording. In performing VSP surveys, a seismic source at the surface is energized, and a seismometer is clamped in a well at a selected location. All downward and upward travelling events are recorded by the seismometer. The seismometer may then be lowered to a second position and the source energized to repeat the signal transmission. Such records may be made at each 5 meter spacing of borehole depth.

Figure 4:
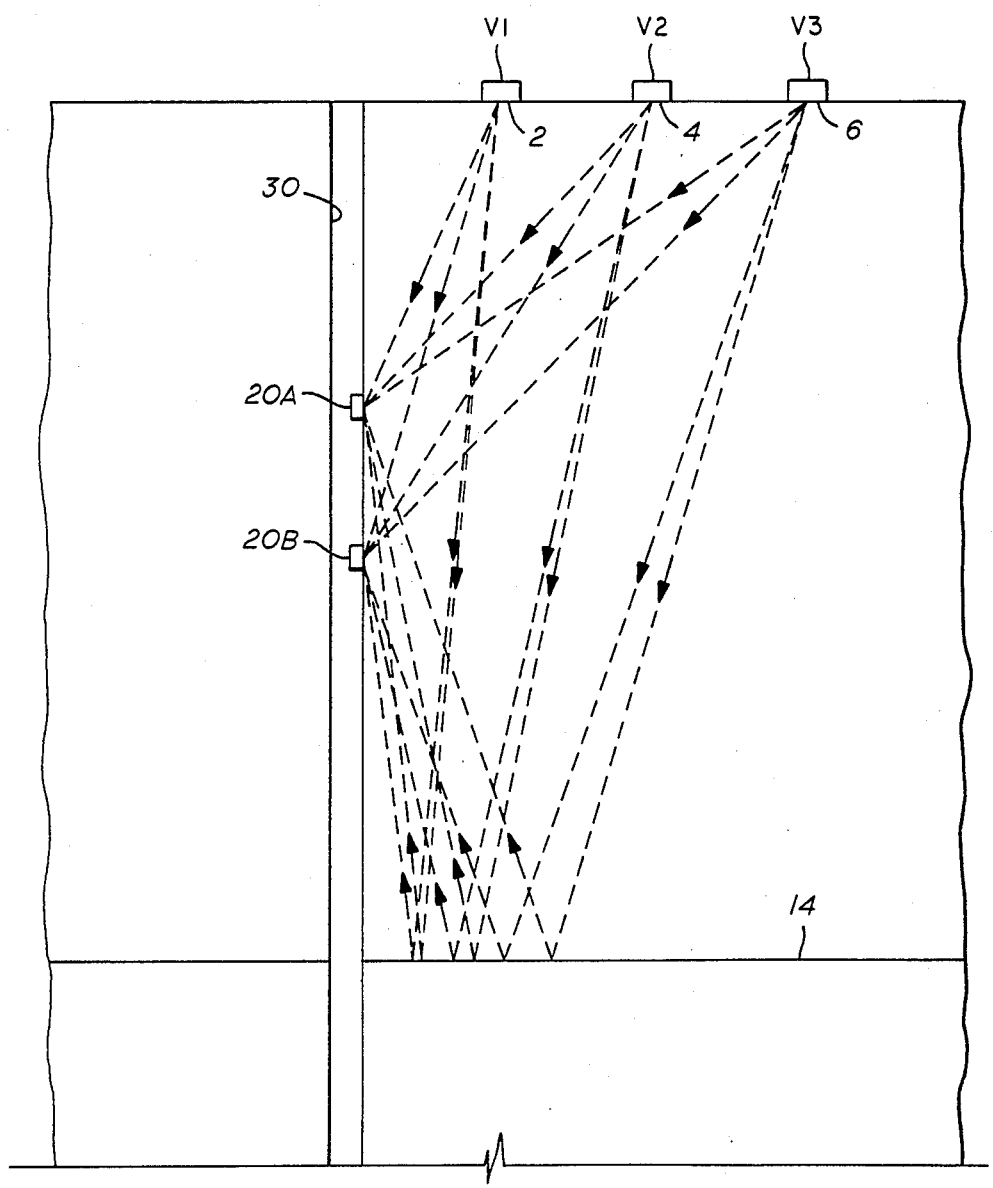
FIG. 4 is a diagram illustrating use of the invention to perform a vertical seismic profiling (VSP) survey.

In performing VSP surveys it may be desirable to record data from multiple offsets simultaneously. Recording multiple offsets simultaneously speeds up the survey and assures that the seismometer is in exactly the same spot for several offsets. The method of the present invention may be utilized to perform such multiple offset recordings. For example, vibratory sources might be positioned as shown in FIG. 4 at locations 2, 4, and 6, which may extend, for example, from 30 meters to 2500 meters from the well. Seismic energy travels directly from vibratory sources positioned at locations 2, 4 and 6 to a seismometer which may be positioned successively at locations such as 20A and 20B in wellbore 30. Energy will also be reflected from subsurface interfaces such as 14 back to the seismometers. Normally, the sequence of n sweeps (or a multiple of n sweeps) will be performed while the seismometer is at each location in accordance with the method of this invention.

In practicing the invention, sweep generators must be employed which are capable of generating the sweep signals with all the offset phase variations required by the different vibrators. However, such generators are well known to the art and will not be described in detail herein.

Although specific ways and means for practicing the invention have been described herein and illustrated in the accompanying drawings, it is nevertheless to be understood that this has been done for purposes of illustration only and that the scope of the invention is not limited thereby but is to be determined from the appended claims.

I claim:

1. A method of conducting n seismic surveys simultaneously at substantially the same location where n is a whole number greater than two comprising:
    simultaneously transmitting n times with n vibratory sources, n signals;
    detecting the n signals resulting from the n simultaneous transmissions of the n signals;
    varying the initial phases of said transmitted signals among n initial phases to enable the signal transmitted by each of the n vibratory sources to be separated from the n detected signals by data processing.

2. The method of claim 1 further comprising:
    correlating separately the detected signals resulting from each simultaneous transmission with the signal transmitted by each vibratory source during the transmission; and
    stacking separately the correlated signals resulting from the correlations of the signals transmitted by each one of the vibratory sources with each detected signal.

3. The method of claim 1 wherein all n signals are identical except for variations in phase.

4. The method of claim 1 wherein one or more of said n signals differs from other of said n signals other than in phase.

5. The method of claim 1 wherein at least one of said vibratory sources comprises a plurality of vibrators.

6. The method of claim 1 wherein the signals resulting from each transmission are detected and the signals originating from each vibratory source are separated from the signals originating from the other vibratory sources by correlating each of the detected signals with the signal transmitted by each of the vibratory sources for each of the transmissions to produce $n^2$ correlation signals and stacking separately each n correlation signals resulting from the correlation of the detected signals with the signals transmitted by each vibratory source.

7. The method of claim 1 wherein the initial phases of the signals are selected from n phase angles, said n phase angles being selected so that the vector summation of n vectors, each having a phase angle corresponding to a different one of said selected phase angles, is substantially zero for equal length vectors, and the initial phases of the signals transmitted by the vibratory sources are varied amoung said n phase angles.

8. The method of claim 1 wherein the initial phase of the signals transmitted by each vibratory source for each transmission is computed from the formula $$\phi_o = \frac{360°(s-1)(v-1)}{n}$$

in which
$\phi_o$ = signal initial phase angle
s = transmission number
v = vibratory source number
n = total number of vibratory sources 9. The method of claim 1 wherein an even number of vibratory sources is used and the initial phases of the transmitted signals are selected from a group of phases in which, for any given selected phase angle, the phase angle 180° out of phase with said given selected phase angle is also selected.

10. The method of claim 9 wherein the initial phase of each signal transmitted by the n vibratory sources during the n transmissions is selected according to the formula.

Phase selection = $(s-1)(v-1) - an$ where
s = transmission number
v = vibratory source number
n = total number of vibratory sources and
a = a whole number selected so that $0 \leq [(s-1)(v-1) - an] \leq n$ and wherein the phase selection comprise phase selections 0 through n, and increasing magnitudes of phase angles correspond to increasing phase selection numbers.

11. The method of claim 8 wherein n=3 and the initial phase angles are 0°, 120°, and 240° and the initial phases of the signals transmitted by each vibratory source during each transmission are:

|  | Sweep 1 | Sweep 2 | Sweep 3 |
| --- | --- | --- | --- |
| Vibrator 1 | 0° | 0° | 0° |
| Vibrator 2 | 0° | 120° | 240° |
| Vibrator 3 | 0° | 240° | 120° |

12. The method of claim 8 wherein n=4 and the initial phase angles are 0°, 90°, 180° and 270 and the initial phases of the signals transmitted by each vibratory source during each transmission are:

|  | Sweep 1 | Sweep 2 | Sweep 3 | Sweep 4 |
| --- | --- | --- | --- | --- |
| Vibrator 1 | 0° | 0° | 0° | 0° |
| Vibrator 2 | 0° | 90° | 180° | 270° |
| Vibrator 3 | 0° | 180° | 0° | 180° |
| Vibrator 4 | 0° | 270° | 180° | 90° |

13. The method of claim 8 wherein n=5 and the selected phase angles iare 0°, 72°, 144°, 216° and 288° and the initial phases of the signals transmitted by each vibratory source during each sweep are:

|  | Sweep 1 | Sweep 2 | Sweep 3 | Sweep 4 | Sweep 5 |
| --- | --- | --- | --- | --- | --- |
| Vibrator 1 | 0° | 0° | 0° | 0° | 0° |
| Vibrator 2 | 0° | 72° | 144° | 216° | 288° |
| Vibrator 3 | 0° | 144° | 288° | 72° | 216° |
| Vibrator 4 | 0° | 216° | 72° | 288° | 144° |
| Vibrator 5 | 0° | 288° | 216° | 144° | 72° |

14. A method of simultaneously conducting n seismic vibrator surveys, where n is a whole number greater than 2, comprising:
 (a) selecting n phase angles such that the vector summation of n vectors, each having a phase angle corresponding to a different one of said selected phase angles, is substantially zero for equal length vectors;
 (b) simultaneously transmitting n times with n vibrators n signals;
 (c) detecting the n signals resulting from the n simultaneous transmission of the n signals;
 (d) varying the initial phases of said transmitted signals among said selected phase angles to enable the signal transmitted by each of the n vibrators to be separated from the n detected signals by data processing.

15. The method of claim 14 wherein the initial signal phase for each vibrator source for each sweep is computed from the formula $$\phi_o = \frac{(s-1)(360°)(v-1)}{n}$$

$\phi_o$ = phase angle where
s = the sweep number
v = the vibrator source number
n = the total number of sources 16. The method of claim 14 wherein an even number of vibrator sources are used and the phase angles are selected such that for any given selected phase angle, the phase angle 180° out of phase with said given selected phase angle is also selected.

* * * * *